(12) United States Patent
Collot et al.

(10) Patent No.: US 7,401,507 B2
(45) Date of Patent: Jul. 22, 2008

(54) ROTARY JOINT FOR A MOVING-VANE MULTIFUNCTION PRESSURE PROBE

(75) Inventors: Lionel Collot, Vendome (FR); Nicolas Hanson, Vendome (FR); Philippe Roberge, Issy-les-Moulineaux (FR)

(73) Assignee: Thales (FR)

( * ) Notice: Subject to any disclaimer, the term of this patent is extended or adjusted under 35 U.S.C. 154(b) by 275 days.

(21) Appl. No.: 10/580,912

(22) PCT Filed: Dec. 4, 2003

(86) PCT No.: PCT/EP03/50941
§ 371 (c)(1),
(2), (4) Date: May 30, 2006

(87) PCT Pub. No.: WO2005/054874
PCT Pub. Date: Jun. 16, 2005

(65) Prior Publication Data
US 2007/0098550 A1    May 3, 2007

(51) Int. Cl.
*A63B 53/00* (2006.01)
(52) U.S. Cl. ............... 73/170.02; 73/170.01; 73/170.05
(58) Field of Classification Search .............. 73/170.01, 73/170.05, 170.02
See application file for complete search history.

(56) References Cited

U.S. PATENT DOCUMENTS

| 2,554,634 | A | | 5/1951 | Paine et al. |
| 2,936,617 | A | | 5/1960 | Beebe |
| 4,182,174 | A | | 1/1980 | Proctor |
| 5,423,209 | A | * | 6/1995 | Nakaya et al. ................. 73/182 |
| 5,797,105 | A | * | 8/1998 | Nakaya et al. .................. 701/7 |
| 5,866,813 | A | * | 2/1999 | Nakaya et al. ................. 73/147 |
| 6,490,510 | B1 | * | 12/2002 | Choisnet ....................... 701/14 |
| 6,679,112 | B2 | * | 1/2004 | Collot et al. ............. 73/170.04 |

FOREIGN PATENT DOCUMENTS

| CH | 264 654 A | 10/1949 |
| WO | 01/67115 A | 9/2001 |

* cited by examiner

*Primary Examiner*—Andre J Allen
(74) *Attorney, Agent, or Firm*—Lowe Hauptman Ham & Berner, LLP

(57) ABSTRACT

The present invention relates to pressure probes for measuring the aerodynamic flight parameters of an aircraft and more particularly those in which the orifices for measuring the static pressure and total pressure are located on a moving angle-of-attack or angle-of-sideslip measurement vane designed to be oriented in the direction of the wind. It consists of a pneumatic rotary joint employing flexible tubings rather than friction rotary joints between abutted parts of rigid tubings. Such a joint offers a much smaller resistance to the rotational movement of the moving vane, which consequently is oriented with greater accuracy in the direction of the wind.

19 Claims, 1 Drawing Sheet

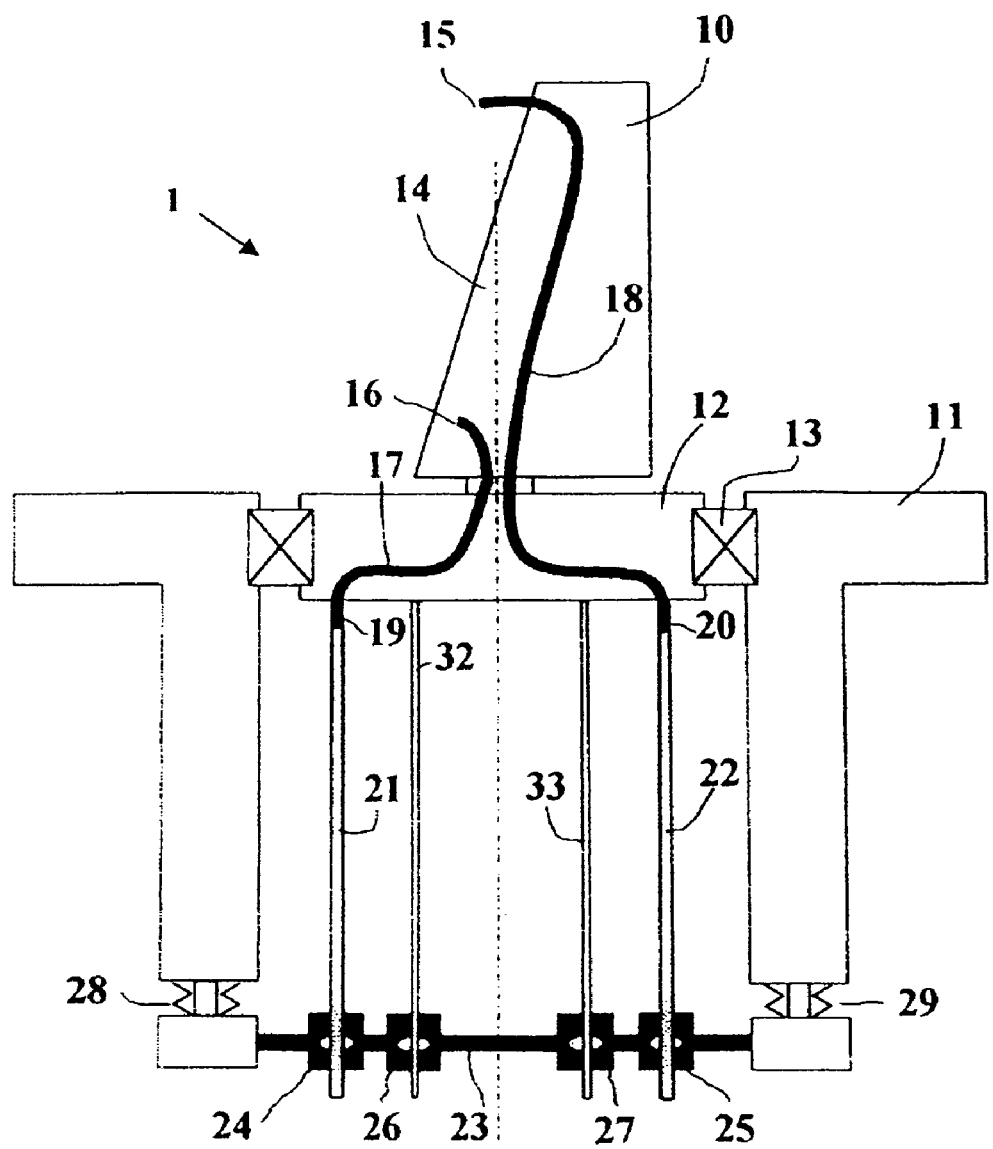
Single figure

US 7,401,507 B2

ROTARY JOINT FOR A MOVING-VANE MULTIFUNCTION PRESSURE PROBE

CROSS-REFERENCE TO RELATED APPLICATIONS

The present Application is based on International Application No. PCT/EP2003/50941, filed on Dec. 4, 2003, which in turn corresponds to FR 02/14816 filed on Nov. 26, 2002, and priority is hereby claimed under 35 USC §119 based on these applications. Each of these applications are hereby incorporated by reference in their entirety into the present application.

FIELD OF THE INVENTION

The present invention relates to anemometer/clinometer probes for measuring the aerodynamic flight parameters of an aircraft and more particularly those in which the orifices for measuring the static pressure and total pressure are located on a moving angle-of-attack or angle-of-sideslip measurement vane designed to be oriented in the direction of the wind.

DESCRIPTION OF THE RELATED ART

Moving-vane multifunction pressure probes have existed for a long time. Such probes are described for example in British patent application GB 1 181 669 published in February 1970, in French patent application FR 2 113 746 published in 1972 or in French patent application FR 2 339 027 published in 1979. They have the advantage of combining, into one and the same device, the static and total pressure taps and the angle-of-attack or angle-of-sideslip sensor, thereby simplifying the installation of the aerodynamic flight parameter sensors on the skin of an aircraft.

In the very large majority of multifunction pressure probes, the pressures, which are taken in orifices located on the moving vane, are transmitted by air lines, through a joint, to stationary pressure sensors placed on the inside of the aircraft's skin or inside the probe, in a less demanding environment than the inside of the moving vane, which is exposed to very large temperature changes due to the external environment and to being heated for the purpose of preventing the possibility of icing up.

Pressure transmission, via an air line, through the moving vane of a multifunction pressure probe and through the joint that attaches the moving vane to the base of the probe is tricky as it has to be faithful and be accomplished with minimal dry friction within the joint, dry friction being the cause of a hysteresis impairing the precision with which the vane is positioned in the direction of the wind, most particularly when the aircraft has a low air speed. To achieve this, it is customary to connect the pressure tap orifices on the moving vane to the pressure sensors placed in the base of a multifunction pressure probe via somewhat rigid lines having two abutted parts that can rotate relative to each other with, at the abutment, a friction rotary joint. Flexible tubings are avoided as far as possible as they are considered not to be very reliable in the harsh environment of a multifunction pressure probe.

This prejudice against flexible tubings is such that they are used in a moving-vane multifunction pressure probe only when it is not possible to do otherwise, because of the configuration of the joint attaching the vane to the base of the probe. The Applicant for its part knows only of a single moving-vane multifunction pressure probe employing a length of flexible tubing over part of a line connecting an orifice located on the moving vane to a pressure sensor placed behind the base of the probe. This probe, which is disclosed in French patent application FR 2 399 027, uses a length of flexible tubing for passing through a universal joint, without thereby saving on a friction rotary joint at the abutment of two rigid pipes in relative rotation that are placed behind the universal joint. This length of flexible tubing here is essential because of the local deformations imposed on the pipe by the universal joint. However, precautions are taken so that it undergoes minimal deformation, thereby explaining the presence of the friction rotary joint. It may be noted that the universal joint is equipped on the inside with a gear train, allowing the angular movement in one of the planes to be converted into an equivalent rotary movement of a hollow shaft followed by the line, and that the length of flexible tubing, which passes along the air line, inside a pin of the universal joint inside the hollow shaft along the axes of the gears, is subjected only to flexural deformations, no relative rotational movement existing between the hollow shaft and the pin of the universal joint.

Other applications of flexible tubing in pressure probes for aircraft are found, but these do not relate to moving-vane multifunction pressure probes. One of these applications disclosed in U.S. Pat. No. 5,130,707, is a connection for flexible air tubings between the root of a pressure probe and the pressure sensor system of the probe, these being distributed inside the skin of an aircraft. Another application, disclosed in U.S. Pat. No. 4,981,038, is a connection by flexible air tubings placed in the extensible root of a deployable pressure probe. In these uses, the flexible tubings are placed in a much less difficult environment than that of a moving-vane multifunction probe joint and are subjected to less frequent deformation.

The friction rotary joints encountered in moving-vane multifunction pressure probes at the abutments of the parts in relative rotation of their air lines are, irrespective of their configuration, essentially the origin of dry friction encountered in the joint. They require, when high accuracy in the angle-of-attack measurement is desired, the mechanical angle measurement to be corrected by a pneumatic measurement of the residual angle of the vane with respect to the direction of the wind or the joint to be pneumatically or electrically assisted, again operating on the basis of a pneumatic measurement of the residual angle of the vane with respect to the direction of the wind. This pneumatic measurement of the residual angle is performed by measuring the differential pressure between the pressure face and the suction face of the moving vane, which involves the presence of other angle-of-attack pressure measurement orifices on the moving vane and other air lines between the vane and the root of the probe, making the probe considerably more complex.

SUMMMARY OF THE INVENTION

It is an object of the present invention to improve the accuracy of the natural orientation, in the direction of the wind, of the moving vane of a multifunction pressure probe while reducing the part of dry friction of the joint attaching the vane to the base of the probe due to the air lines and possibly the electrical lines passing through the joint.

The subject of the invention is a rotary joint for a multifunction pressure probe, comprising a fastening base equipped with a bearing, a moving vane free to rotate over a limited deflection and provided with a root swiveling in the bearing of the fastening base, pressure tap orifices located on the moving vane, pressure sensors placed on the outside of the moving vane and air lines that connect the pressure tap orifices to the pressure sensors passing through the root of the moving vane and the bearing of the fastening base. According to the invention said rotary joint comprises a plate, which can rotate relative to the root of the moving vane and is fastened to the fastening base, along the axis and at a distance from the bearing that supports the moving vane, and lengths of flexible tubing that connect the root of the moving vane to the plate and constitute the air lines over part of their path going from the root of the moving vane to the plate beyond which the pressure sensors are placed.

Advantageously, the rotary joint also includes electrical wires that connect the root of the moving vane to the plate and form part of electrical connections going from the moving vane to the body of the multifunction pressure probe.

Advantageously, the lengths of flexible tubing and/or electrical wires connecting the root of the moving vane to the plate are placed symmetrically with respect to the axis of the bearing.

Advantageously, when the joint includes electrical wires that connect the root of the moving vane to the plate, these follow paths parallel to those of the lengths of flexible tubing, which are symmetrical with respect to the axis of the bearing and are close to this axis.

Advantageously, the lengths of flexible tubing that connect the root of the moving vane to the plate are made of a thermoplastic elastomer.

Advantageously, the lengths of flexible tubing that connect the root of the moving vane to the plate are made of a thermoplastic elastomer of the styrene/ethylene-butylene/styrene copolymer type modified with silicone oil.

Advantageously, the plate is made of an elastic material that absorbs, by its deformation, some of the elongational forces undergone by the lengths of flexible tubing and/or the electrical wires during the relative rotational movements between the root of the moving vane and the plate.

Advantageously, the plate is made of a thermoplastic elastomer that absorbs, by its elastic deformation, some of the elongational forces undergone by the lengths of flexible tubing and/or the electrical wires during the relative rotational movements between the root of the moving vane and the plate.

Advantageously, the plate is made of a thermoplastic elastomer of the styrene/ethylene-butylene/styrene copolymer type modified with silicone oil, which absorbs, by its elastic deformation, some of the elongational forces undergone by the lengths of flexible tubing and/or the electrical wires during the relative rotational movements between the root of the moving plane and the plate.

Advantageously, the plate is attached to the fastening base via a flexible fastening allowing limited deflection of the plate with respect to the fastening base, partly absorbing the elongational forces undergone by the lengths of flexible tubing and/or during the relative rotational movements between the root of the moving vane and the plate.

Advantageously, the lengths of flexible tubing and/or electrical wires are slightly tensioned between the root of the moving vane and the plate.

BRIEF DESCRIPTION OF THE DRAWINGS

Other features and advantages of the invention will become apparent from the description below of one embodiment given by way of example. This description is made in conjunction with the drawing, the single FIGURE of which shows schematically a moving-vane pressure probe according to the invention, seen end on and partially cut-away.

DETAILED DESCRIPTION OF THE EMBODIMENTS

The FIGURE shows, without being drawn to scale, a multifunction pressure probe 1 with its moving vane 10 and its fastening base 11.

The moving vane 10, in the form of a fin, is fastened via its root 12 in a bearing 13 of the fastening base 11, thereby allowing it to rotate about a longitudinal axis 14 and giving it the possibility of being oriented in the direction of the wind in the manner of a weather cock.

The fastening base 11 is designed to be mounted on the skin of an aircraft so that the moving vane 10 of the probe 1 projects to the outside of the aircraft and is oriented according to the local flow of the air relative to the skin of the aircraft. Thus, the angle of orientation adopted by the moving vane 10 is the local angle-of-attack or the angle-of-sideslip according to the configuration on the aircraft. Stops (not shown) limit the deflection of the moving vane on either side of the neutral position, for example to ±60°.

In addition to the local angle-of-attack measurement, the probe 1 allows measurements of the dynamic and static pressures thanks to air taps 15, 16 made on the moving vane 10 and air lines that connect these air taps 15, 16 to pressure sensors (not shown) placed on the inside of the aircraft.

The air lines connecting the air taps 15, 16 located on the moving vane to the pressure sensors placed inside the aircraft pass through the root 12 of the moving vane 10. They must faithfully transmit the pressures at the air taps 15, 16 to the pressure sensors, while still accommodating the relative rotational movements of the moving vane 10 with respect to the fastening base 11 and opposing these movements with only a minimal restoring force.

In the first part of their path going, within the moving vane 10, from the air taps 15, 16 to the root 12 of the vane, the air lines are produced by means of suitably curved rigid metal tubes 17, 18, which terminate in openings 19, 20 projecting beneath the root of the moving vane 12.

In the second part of their path on the outside of the moving vane 12, the air lines are produced using lengths of flexible tubing 21, 22 that are fitted over the openings 19, 20 of the metal tubes 17, 18 projecting from the root 12 of the moving vane 10 are also held in place by a plate 23 through which they pass before continuing their paths toward the pressure sensors placed on the inside of the aircraft's skin.

The fact of using lengths of flexible tubing 21, 22 instead of lengths of rigid tubing butted together by means of friction rotary joints makes it possible for the dry friction during rotation of the moving vane 10 to be substantially reduced since it is therefore no longer a question of dry friction but of elastic stiffness. This elastic stiffness may be reduced as much as desired by varying the nature of the flexible tubings, their diameter, their arrangement relative to the rotation axis of the bearing 13 and the distance of the plate 23 from the root 12 of the moving vane.

The FIGURE also shows multistrand electrical wires 32, 33 placed parallel to the lengths of flexible tubing 21, 22 in the gap between the root 12 of the moving vane 10 and the plate 23. These electrical wires 32, 33 are intended for a heating system mounted in the moving vane 10 of the probe in order to prevent it from icing up. Other multistrand electrical wires, again placed parallel to the lengths of flexible tubing 21, 22 may be used, especially for measuring the value of a thermistance of a system for measuring the total temperature of the air, said system being mounted in the moving vane. These electrical wires have, unlike the flexible tubings, a high longitudinal stiffness that is transformed into elastic stiffness by the flexibility of the plate 23 or of its fastening.

The error in angular measurement resulting from the difference between the true position $\alpha_v$ and the measured position $\alpha$ of the vane induced by the elastic stiffness due to the lengths of flexible tubing 21, 22 and to the electrical wires 32, 33 may be subjected to a subsequent compensation, as it may be calculated by means of the equation:

$$\alpha_v - \alpha = \frac{(\alpha - \alpha_0)R}{kV^2} \quad (1)$$

V being the air speed, $kV^2$ the aerodynamic restoring force of the vane in the direction of the wind, $\alpha_0$ the neutral position of the vane and R the stiffness coefficient. To a first approximation:

$$P_t - P_s = \frac{1}{2}\rho V^2$$

$P_t$ being the total pressure and $P_s$ being the static pressure, so that equation (1) becomes:

$$\alpha_v - \alpha = \frac{(\alpha - \alpha_0)\rho R}{2k(P_t - P_s)} = K\frac{(\alpha - \alpha_0)}{(P_t - P_s)}$$

where $\alpha_0$ may be set to the angle-of-attack zero and K may be measured in a wind tunnel. The parameters $P_t$, $P_s$ and $\alpha$ are measured by the probe. The correction $(\alpha_v\text{-}\alpha)$ may therefore be calculated and the true angle $\alpha_v$ deduced from the angle $\alpha$ measured by the probe.

In this case, the system for measuring the angular position of the moving vane 10 includes a sensor for measuring the angular position of the vane 10 together with error estimation means operating on the basis of the above equation and means for correcting the measurement by the angular position sensor, taking into account the estimated error provided by the error estimation means.

The lengths of flexible tubing 21, 22 and the electrical wires 32, 33 are fastened at the plate 23 in penetrations 24, 25, 26, 27 which may have thicker walls than the plate 23 in order to improve their retention.

The plate 23 is placed beneath the fastening base 11 of the probe, along the axis of and at a certain distance from the bearing 13. It is attached to the fastening base 11 of the probe so as to greatly limit and possibly prevent any rotational movement about the axis of the bearing 13 so that the relative rotational movement of the moving vane 10 with respect to the fastening base 11 of the probe is, for the large part, between the root 12 of the moving vane 10 and the plate 23. Thus, any deformation on the lengths of flexible tubing 21, 22 by the relative movement of the moving vane 10 with respect to the fastening base 11 of the probe is localized along the distance separating the root 12 of the moving vane 10 from the plate 23.

In the gap separating the root 12 of the moving vane 10, the electrical wires 32, 33 are placed symmetrically with respect to the axis 14 of the bearing 13, close to the axis 14 so as to minimize the restoring torque due to their stiffness. Likewise, the lengths of flexible tubing 21, 22 are placed symmetrically with respect to the axis 14 of the bearing 13 so that both undergo the same deformation amplitudes. To avoid any frictional wear of one against the other during the rotational movements of the moving vane or any vibrations transmitted by the structure of the aircraft, the flexible tubings 21, 22 and electrical wires 32, 33 are slightly tensioned in the gap separating the root 12 of the vane 10 from the plate 23, these being fastened to this plate 23 and to the root 12 of the moving vane so as to be parallel to the axis of the bearing 13 when the moving vane 10 is in the neutral position and are sufficiently far apart not to be touched when the moving vane 10 comes into its stop positions.

Because they are slightly tensioned, the lengths of flexible tubing 21, 22 are subjected to tensile or elongational forces owing to the moving vane 10 when the latter moves away from its neutral position. They then exert, in reaction, a torque restoring the vane to its neutral position, which is deleterious as it introduces an error in the positioning of the vane in the direction of the wind, which error increases as the air speed of the aircraft decreases and as the vane moves away from its neutral position. To bring this restoring torque to a very low value, it is possible to vary various factors:

the diameter, thickness and nature of the lengths of flexible tubing 21, 22;

the length of the flexible tubings 21, 22, that is to say the spacing between the root 12 of the moving vane, but this is rapidly limited by the available space in the aircraft to the rear of the probe root;

the capability of absorption, by the plate 23 or its fastening to the base 11 of the probe, of the tensile forces exerted by the moving vane 10 on the lengths of flexible tubing 21, 22 during its rotational movements;

the distance of the lengths of flexible tubing 21, 22 from the axis 14 of the bearing; and the maximum deflection.

When the moving vane 10 moves away from its neutral position, the plate 23 absorbs the tensile forces exerted on the electrical wires 32, 33 and also a relatively large part of the forces exerted on the lengths of flexible tubing 21, 22 either, as shown, thanks to an elastic system 28, 29 for attachment to the fastening base 11 allowing a certain deflection depthwise with respect to the base, or by elastic deformation thanks to natural flexibility, or else by a combination of natural flexibility and an elastic attachment system.

The lengths of flexible tubing 21, 22 must withstand the rigorous environmental conditions encountered on the skin of the aircraft and must not undergo premature aging liable to weaken them in the long term and to impair the reliability of the probe. Advantageously, they are made of a thermoplastic elastomer such as a styrene/ethylene-butylene/styrene copolymer modified with silicone oil. Flexible tubings of this composition have already been proposed commercially for exclusively medical use, for example by the company Consolidated Polymer Technologies, which sells them under the name "C-Flex® 50A".

The plate 23 may consist of a flexible sheet made of rubber or an elastomer, for example a thermoplastic elastomer such as a modified styrene/ethylene-butylene/styrene copolymer like the flexible tubings, and may be fastened to the base 11 of the probe by a rigid attachment system, such as a rigid clip fastened to the base by screws.

The invention claimed is:

1. A rotary joint for a multifunction pressure probe, comprising a fastening base equipped with a bearing, a moving vane free to rotate over a limited deflection and provided with a root swiveling in the bearing of the fastening base, pressure tap orifices located on the moving vane, pressure sensors placed on the outside of the moving vane and air lines that connect the pressure tap orifices to the pressure sensors passing through the root of the moving vane and the bearing of the fastening base, said rotary joint comprising a plate, which can rotate relative to the root of the moving vane and is fastened to the fastening base with respect to which it has a slight depth deflection, along the axis and at a distance from the bearing that supports the moving vane, and lengths of flexible tubing that connect the root of the moving vane to the plate and constitute the air lines over part of their path going from the root of the moving vane to the plate beyond which the pressure sensors are placed.

2. The rotary joint as claimed in claim 1, further comprising electrical wires that connect the root of the moving vane to the plate and form part of electrical connections going from the moving vane to the body of the multifunction pressure probe.

3. The rotary joint as claimed in claim 1, further comprising a system for measuring the angular position of the moving vane with means for correcting the measurement error due to the elastic stiffness estimated from the equation:

$$\alpha_v - \alpha = \frac{(\alpha - \alpha_0)R}{kV^2}$$

V being the air speed, $kV^2$ the aerodynamic restoring force of the vane in the direction of the wind, $\alpha_0$ the neutral position of the vane and R the stiffness coefficient.

4. The rotary joint as claimed in claim 1, further comprising a system for measuring the angular position of the moving vane with means for correcting the measurement error due to the elastic stiffness estimated from the equation:

$$\alpha_v - \alpha = K \frac{(\alpha - \alpha_0)}{(P_t - P_s)}$$

K being a coefficient measured in a wind tunnel, $P_t$ the total pressure, $P_s$ the static pressure and $\alpha_0$ the neutral position of the vane.

5. The rotary joint as claimed in claim 1, wherein the lengths of flexible tubing that connect the root of the moving vane to the plate are placed symmetrically with respect to the axis of the bearing.

6. The rotary joint as claimed in claim 2, wherein the electrical wires that connect the root of the moving vane to the plate are placed symmetrically with respect to the axis of the bearing and close to this axis.

7. The rotary joint as claimed in claim 1, wherein the lengths of flexible tubing that connect the root of the moving vane to the plate are made of a thermoplastic elastomer.

8. The rotary joint as claimed in claim 1, wherein the lengths of flexible tubing that connect the root of the moving vane to the plate are made of a thermoplastic elastomer of the styrene/ethylene-butylene/styrene copolymer type modified with silicone oil.

9. The rotary joint as claimed in claim 1, wherein the slight deflection of the plate is obtained by deformation of said plate, the latter being made of an elastic material that absorbs, by its deformation, some of the elongational forces undergone by the lengths of flexible tubing during the relative rotational movements between the root of the moving vane and the plate.

10. The rotary joint as claimed in claim 2, wherein the slight deflection of the plate is obtained by deformation of said plate, the latter being made of an elastic material that absorbs, by its deformation, the elongational forces undergone by the electrical wires and also some of the elongational forces undergone by the lengths of flexible tubing during the relative rotational movements between the root of the moving vane and the plate.

11. The rotary joint as claimed in claim 9, wherein the plate is made of rubber.

12. The rotary joint as claimed in claim 9, wherein the plate is made of an elastomer.

13. The rotary joint as claimed in claim 9, wherein the plate is made of a thermoplastic elastomer.

14. The rotary joint as claimed in claim 9, wherein the plate is made of a thermoplastic elastomer of the styrene/ethylene-butylene/styrene copolymer type modified with silicone oil.

15. The rotary joint as claimed in claim 1, wherein the slight deflection of the plate is obtained by a flexible fastening to the fastening base that partly absorbs the elongational forces undergone by the lengths of flexible tubing during the relative rotational movements between the root of the moving vane and the plate.

16. The rotary joint as claimed in claim 2, wherein the slight deflection of the plate is obtained by a flexible fastening to the fastening base that absorbs the elongational forces undergone by the electrical wires and also some of the elongational forces undergone by the lengths of flexible tubing during the relative rotational movements between the root of the moving vane and the plate.

17. The rotary joint as claimed in claim 1, wherein the lengths of flexible tubing are slightly tensioned between the root of the vane and the plate.

18. The rotary joint as claimed in claim 2, wherein the electrical wires are slightly tensioned between the root of the vane and the plate.

19. The rotary joint as claimed in claim 2, wherein the electrical wires pass, on leaving the root of the moving vane through the plate, following, between the root of the moving vane and the plate, paths parallel to those of the lengths of flexible tubing, these being symmetrical with respect to the axis of the bearing (13).

* * * * *